United States Patent [19]

Ozawa

[11] Patent Number: 5,467,467
[45] Date of Patent: Nov. 14, 1995

[54] HIGH RELIABILITY CONSOLE CONNECTING DEVICE

[75] Inventor: Masahiro Ozawa, Tokyo, Japan

[73] Assignee: NEC Corporation, Tokyo, Japan

[21] Appl. No.: 64,585

[22] Filed: May 21, 1993

[30] Foreign Application Priority Data

May 21, 1992 [JP] Japan ................................. 4-153047

[51] Int. Cl.$^6$ .................................................. G06F 11/30
[52] U.S. Cl. ...................................................... 395/185.08
[58] Field of Search .................................. 395/575, 200, 395/275, 325; 371/62, 8.1, 9.1; 364/187

[56] References Cited

U.S. PATENT DOCUMENTS

| | | | |
|---|---|---|---|
| 4,321,666 | 3/1982 | Tasar et al. | 364/200 |
| 4,545,013 | 10/1985 | Lyon et al. | 364/200 |
| 4,868,818 | 9/1989 | Madan et al. | 371/11.3 |
| 5,134,712 | 7/1992 | Yamamoto | 395/800 |
| 5,274,797 | 12/1993 | Barlow et al. | 395/575 |
| 5,315,711 | 5/1994 | Barone et al. | 395/275 |

Primary Examiner—Robert W. Beausoliel, Jr.
Assistant Examiner—Stephen C. Elmore
Attorney, Agent, or Firm—Foley & Lardner

[57] ABSTRACT

A console connecting device contains a central processing unit that includes a communication device for transmitting a command and receiving an event message from a set of consoles. A re-connector is provided for initializing an interface and re-transmitting the command upon resetting of the interface to the consoles. Each of the consoles include an inheritor for inheriting information upon failure of the counterpart console and means for returning the event message by executing the received command. An interface connection is interposed between the central processing unit and the two consoles and includes a timer for detecting reception of the event messages from the console within a predetermined period of time after reception of the command from the central processing unit, and a switch for switching connection from one of the two consoles to the other console in response to a time-out signal representative of the fact that the event message from the console is not received within the predetermined period of time.

9 Claims, 2 Drawing Sheets

HIGH RELIABILITY CONSOLE CONNECTING DEVICE

BACKGROUND OF THE INVENTION

FIELD OF THE INVENTION

The present invention relates generally to an information processing system including a console. More specifically, the invention relates to an apparatus and method for providing highly reliable connection of an operator console.

In the conventional console connection method, a main console and an auxiliary console are connected to a central processing unit (CPU) simultaneously to provide for increased reliability. In this case, the main console and the auxiliary console are each connected to the CPU through respectively corresponding interfaces.

However, in such a conventional method, since the main console and the auxiliary console are simultaneously connected to the CPU via two interfaces, an extra interface which could otherwise be used for another purpose is occupied. Also, since the main console and the auxiliary console have to be controlled simultaneously, the load on the controlling software is increased.

Therefore, one can consider a method to commonly use a single interface for the main and auxiliary consoles so that connection with the CPU is changed over from one console to the other when failure is caused in one console.

However, the foregoing method is not always effective since if a critical failure is caused in the console, the faulty console may not generate a connection demand to the CPU. In such a case, the CPU cannot be controlled, possibly causing shutdown of the overall system.

SUMMARY OF THE INVENTION

Therefore, it is an object of the present invention to provide a highly reliable console connection apparatus and method which does not require an extra interface and does not increase the load on the control software.

In order to accomplish the above-mentioned object, a console connection, according to one aspect of the invention, comprises:

a central processing unit including a communication device for transmitting a command and receiving an event message from consoles, a reconnector for initializing an interface and re-transmitting the command upon resetting of the interface to the consoles;

two consoles including an inheritor for inheriting information upon failure of the counterpart console and means for returning the event message by executing the received command; and an interface connector interposed between the central processing unit and the two consoles and including a timer for detecting reception of the event message from the console within a predetermined period of time after reception of the command from the central processing unit, and a switch for switching connection from one of the two consoles to the other console in response to a time-out signal representative of the fact that the event message from the console is not received within the predetermined period of time.

According to another aspect of the invention, a console connection comprises:

a central processing unit including a communication device for transmitting a command and receiving an event message from consoles, a reconnector for initializing an interface and re-transmitting the command upon resetting of the interface to the consoles;

two consoles including a detector for detecting failure of the counterpart console, an inheritor for inheriting information upon failure of the counterpart console and subsequently issuing a connection demand to the central processing unit, and means for returning the event message by executing the received command; and an interface connector interposed between the central processing unit and the two consoles and including a switch for switching connection from one of the two consoles to the other console in response to the connection demand from the console.

According to a further aspect of the invention, a console connection comprises:

a central processing unit including a communication device for transmitting a command and receiving an event message from consoles, a reconnector for initializing an interface and re-transmitting the command upon resetting of the interface to the consoles;

two consoles including a detector for detecting failure of the counterpart console, an inheritor for inheriting information upon failure of the counterpart console and subsequently issuing a connection demand to the central processing unit, and means for returning the event message by executing the received command; and an interface connector interposed between the central processing unit and the two consoles and including a timer for detecting reception of the event message from the console within a predetermined period of time after reception of the command from the central processing unit, a switch for switching connection from one of the two consoles to the other console in response to either a time-out signal representative of the fact that the event message from the console is not received within the predetermined period of time or the connection demand from the console.

BRIEF DESCRIPTION OF THE DRAWINGS

The present invention will be understood more fully from the detailed description and from the accompanying drawings of the preferred embodiment of the invention, which, however, should not be taken to be limitative to the invention but are for explanation and understanding only, wherein.

DESCRIPTION OF THE PREFERRED EMBODIMENT

Figure 1:
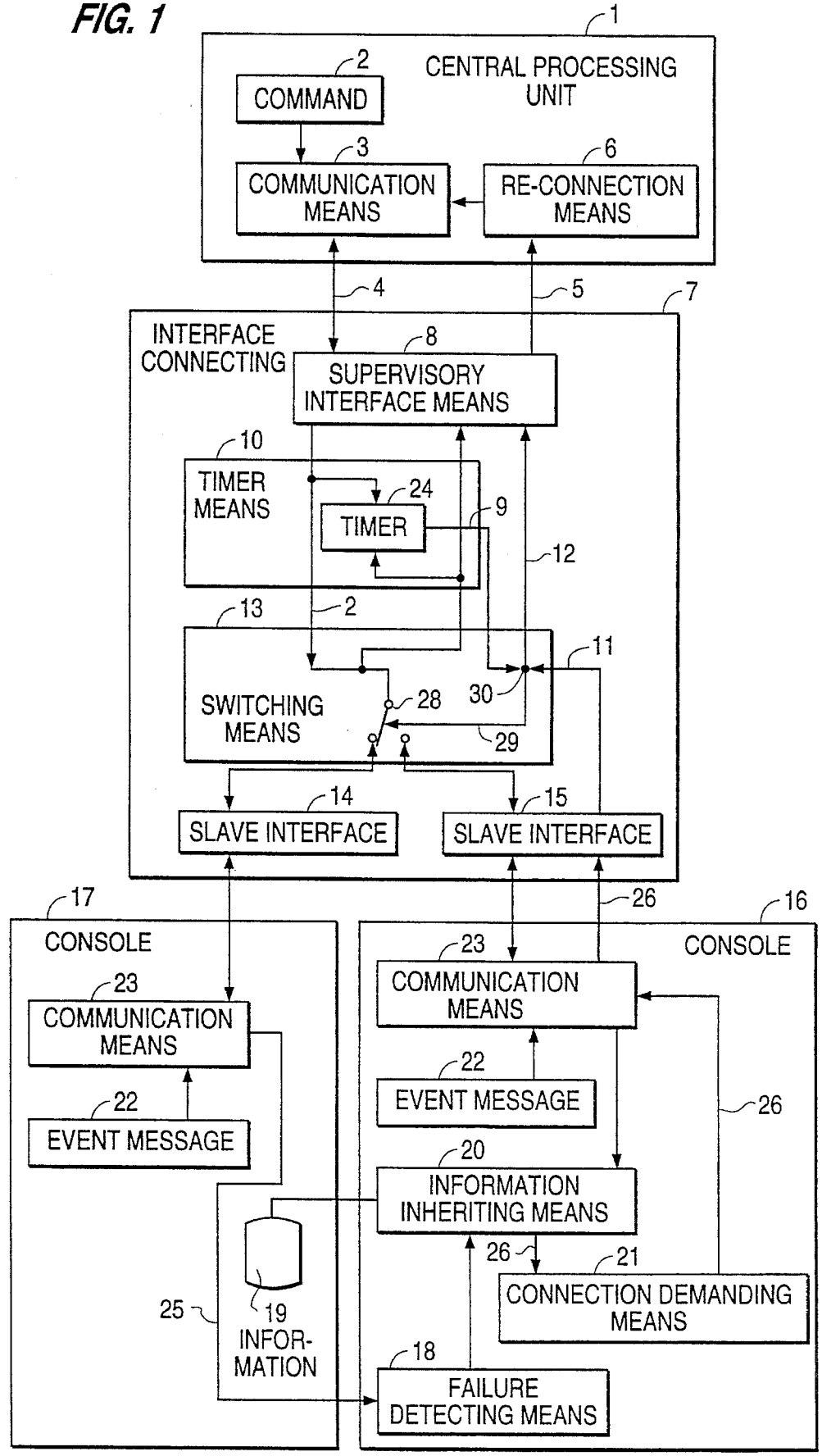
FIG. 1 is a schematic block diagram of the preferred embodiment of a console connection according to the present invention.

The preferred embodiment of a console connection according to the present invention will be discussed in detail with reference to the accompanying drawings. In FIG. 1, a central processing unit (CPU) 1 includes a communication means 3 for transmitting a command 2 and receiving event messages from consoles 16 and 17 and a re-connection means 6 for commanding the communication means 3 to re-transmit the command 2 and initialize an interface 4 in response to a reset command 5.

An interface connector 7 is disposed in a path between the central processing unit 1 and the consoles 16 and 17 for selectively connecting one of the consoles 16 and 17 to the central processing unit 1. Therefore, the interface connecting means 7 includes a supervisory interface means 8 connected to the central processing unit 1, a timer means 10, a switching means 13 for alternately switching between the consoles 16 and 17, and slave interface means 14 and 15 respectively connected to the corresponding consoles 17 and 16.

The supervisory interface means 8 receives the command 2 from the central processing unit 1 via interface 4 and feeds event messages originating from the consoles 16 and 17 to the central processing unit 1 via interface 4. Also, the supervisory interface means 8 sends a reset command 5 to the central processing unit 1 in response to a reset demand 12 from the switching means 13.

The timer means 10 initiates measurement of an elapsed time by a timer 24 upon reception of the command 2 for the consoles 16 and 17 via the supervisory interface means 8. Also, the timer means 10 resets the timer 24 upon reception of the event message from the consoles 16 and 17 to the central processing unit 1 via the switching means 13.

Furthermore, the timer means 10 resets the timer 24 and transmits a time-out signal 9 to the switching means 13 when the event message is not transmitted from the consoles 16 and 17 to the central processing unit 1 within a predetermined period of time from the time the command 2 was sent to the interface consoles 16 and 17. Time-out signal 9 is shown here terminating within switching means 13 at terminating point 30. The connection demand 11 which is received from console 16 via slave interface 15 also terminates within switching means 13 at terminating point 30. Terminating point 30 is shown, for simplicity, as a "point." Logically, terminating point 30 can be viewed as an OR gate having the time-out signal 9 and connection demand 11 as inputs and having two outputs. One of these outputs is signal 29 to the switch portion 28 of switching means 13 and the other is the reset demand 12 to the supervisory interface means 8.

The switch portion 28 of the switching means 13 thus changes over between the two slave interface means 14 and 15 when a connection demand 11 is received from the console 16 via the slave interface means 15 or when the time-out signal 9 is received from the timer means 10. The switching means 13 then also transmits the reset demand 12 to the supervisory interface means 8 for reconnection.

The slave interface means 14 and 15 are respectively connected to the consoles 17 and 16 to feed the command 2 from the central processing unit 1. Also, the slave interface means 14 and 15 transmit the event message from the consoles 16 and 17 to the central processing unit 1.

The consoles 16 and 17 include communication means 23 for executing command 2 received from the central processing unit 1 via the interface connecting device 7 and returning the event message 22 to the central processing unit 1.

Also, the console 16 includes a failure detecting means 18 for detecting failure caused on the other console 17, an information inheriting means 20 for inheriting information 19 of the other console 17, and a connection demanding means 21 for commanding to the communication means 23 for transmitting a connection demand 26.

The failure detecting means 18 detects the occurrence of failure of the other console 17 by a failure occurrence signal 25 transmitted from the communication means 23 of the other console 17. The information inheriting means 20 is responsive to a notice of occurrence of failure of the other console 17 from the failure detecting means 16, to inherit the information 19 of the other console 17. The connection demanding means 21 is responsive to a notice of inheriting of information 19 of the other console 17 from the information inheriting means 20, to command transmission of the connection demand 26 for the central processing unit 1 to the communication means 23.

Here, the console 17 has the failure detecting means 18, the information inheriting means 20 and the connection demanding means 21 similarly to the console 16. On the other hand, the console 16 is provided with information 19 similarly to the console 17. In the drawing, the information 19 of the console 16 and the failure detecting means 18, the information inheriting mean 20 and the connection demanding means 21 are neglected for clarity of illustration.

Figure 2:
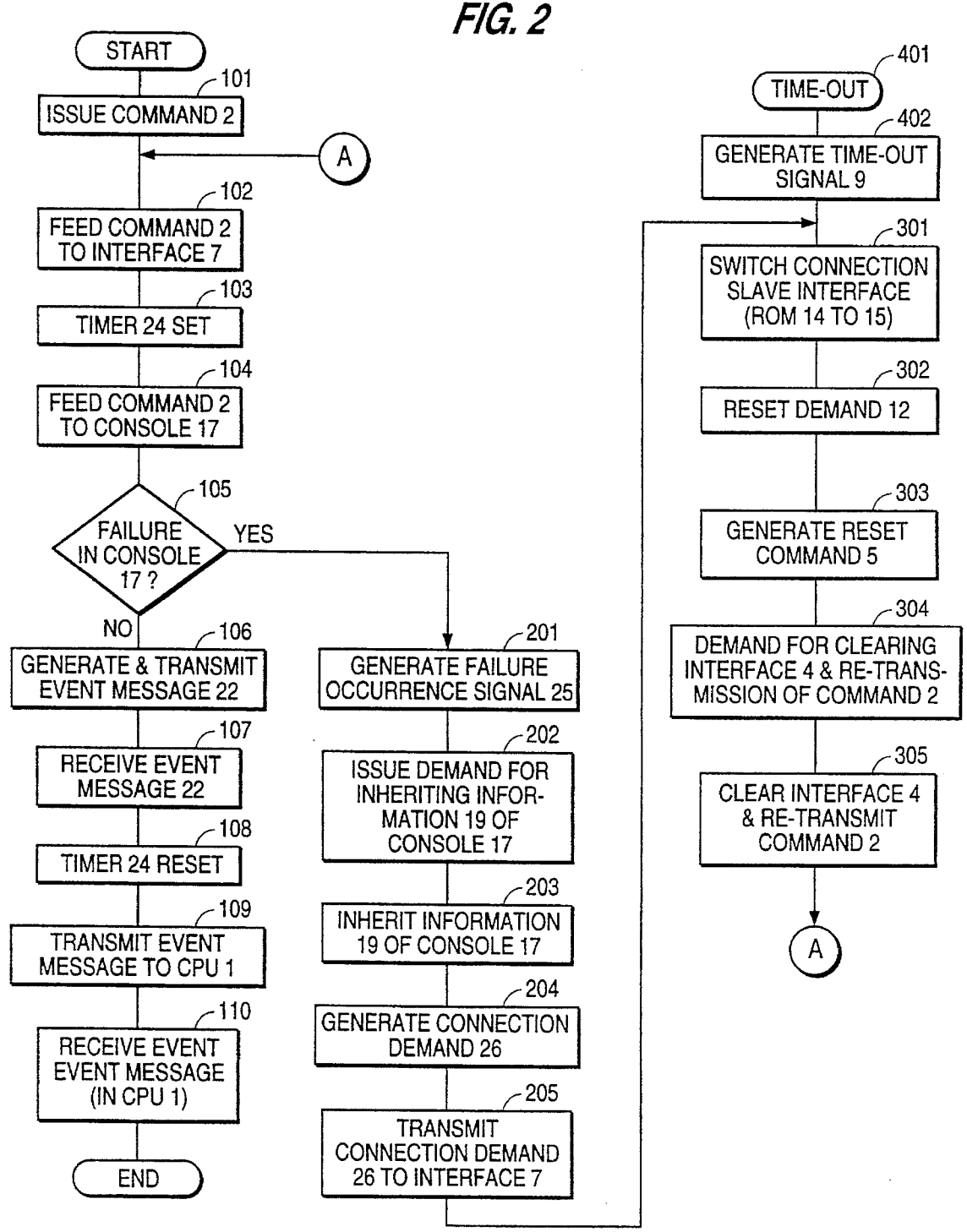
FIG. 2 is a flow-chart showing operation of the embodiment of FIG. 1.

The switching operation between the consoles 16 and 17 in the shown embodiment of the console connection device according to the present invention will be discussed herebelow with reference to the FIGS. 1 and 2.

At first, when the central processing unit 1 issues the command 2 (Step 101), the command 2 is fed to the supervisory interface means 8 of the interface connecting means 7 through the communication means 3 and interface 4 (Step 102). The supervisory interface means 8 transmits the received command 2 to the timer means 10.

The timer means 10 sets the internal timer 24 and initiates measurement of the elapsed time upon reception of the command 2 from the supervisory interface means 8 (Step 103). Then, as part of Step 104, the timer means 10 feeds the command 2 to the switching means 13. The switching means 13 feeds the command 2 to the slave interface means 14 which is currently connected to the central processing unit 1, when the command 2 is received from the timer means 10, as an additional part of Step 104.

Step 104 is completed when the slave interface means 14 feeds the command 2 to the communication means 23 of the console 17 upon reception of the command 2 from the switching means 13. If operating correctly (Step 105), the console 17 transmits the event message 22 to the slave interface means 14 of the interface connecting device 7 via the communication means 23 (Step 100).

The slave interface means 14 transmits the event message 22 to the timer means 10 via the switching means 13 upon reception of the event message from the slave console 17 (Step 107). Upon reception of the event message 22 via the switching means 13, the timer means 10 resets the timer 24, which is previously set (Step 108), and feeds the event message 22 to the central processing unit 1 via the supervisory interface means 8 (Steps 109 and 110).

The foregoing operation is the operation to be performed when the console 17 is in the normal operation. If failure is caused after the slave console 17 receives the command 2 from the interface connector 7 to make it impossible to send the event message 22 to the central processing unit 1 (output YES of Step 105), the failure occurrence signal 25 is output to the slave console 16 from the communication means 23 of the faulty console 17.

The failure detecting means 18 of the console 16 is responsive to the failure occurrence signal 25 from the communication means 23 of the console 17 to issue a demand for the information inheriting means 20 for inheriting information 19 of the console 17 (Step 202).

Upon reception of the demand, the information inheriting means 20 inherits the information 19 of the console 17 (Step 203). Subsequently, the information inheriting means 20 feeds a connection demand 26 to the connection demanding means 21 (Step 204). The connection demanding means 21 is responsive to the connection demand 26 to transmit the connection demand 26 to the slave interface means 15 of the interface connecting device 7 via communication means 23 (Step 205).

The slave interface means 15 is responsive to the connection demand 26 from the slave console 16 to feed the connection demand 11 to the switching means 13. The switch 28 of switching means 13 then switches the connection from the slave interface means 14 to the slave interface means 15 upon reception of the connection demand 11 from the slave interface means 15 (Step 301). The switching means 13 further feeds the reset demand 12 to the supervisory interface means 8 (Step 302).

The supervisory interface means 6 is responsive to the reset demand from the switching means 13 to transmit a reset command 5 to the reconnector means 6 of the central processing unit 1 (Step 303). The reconnector means 6 is responsive to the reset command 5 from the supervisory interface 8 to demand to the communication means 3 for clearing of the interface 4 and re-transmitting of the command 2 (Step 304).

The communication means 3 is responsive to the demand to clear the interface 4 and subsequently transmit the command 2 to the supervisory interface 8 of the interface connecting device 7 (Step 305). Although the operations following transmission of the command 2 are the same as those set forth above, since the slave interface 15 is now connected to the central processing unit 1 by switch of the switching means 13, the command 2 is transmitted to the communication means 23 of the console 16.

The console 16 is responsive to the command 2 to transmit the event message 22 to the central processing unit 1 via the interface connecting device 7 in the same manner to that of the console 17.

Next, discussion will be given for the case where the failure is caused after the console 17 receives the command 2 from the interface connecting device 7 which it is impossible to send the event message 22 to the central processing unit 1 and the communication means 23 cannot send the failure occurrence signal 25 to the console 16.

In this case, after a predetermined period of time is elapsed, the timer 24 of the timer means 10 enters the time-out state (Step 401). Then, the time-out signal 9 is output from the timer means 10 to the switching means 13 (Step 402).

The switch 28 of the switching means 13 is responsive to the time-out signal 9 from the timer means 10 to switch the connection from the slave interface means 14 to the slave interface means 15 (Step 301), and, in conjunction therewith, switching means 13 transmits the reset demand 12 to the supervisory interface means 8 (Step 302).

The supervisory interface means 8 is responsive to the reset demand from the switching means 13 to transmit a reset command 5 to the re-connection means 6 of the central processing unit 1 (Step 303). The re-connection means 6 is responsive to the reset command 5 from the supervisory interface means 8 to clear the interface 4 and demand re-transmission of the command 2 (Step 304).

The communication means 3 is responsive to the demand for re-transmission of the command 2 to clear the interface 4 and subsequently transmit the command 2 to the supervisory interface means 8 of the interface connecting device 7 (Step 305). The operations subsequent to transmission of the command 2 are the same as those set forth above. However, since the switch 28 of the switching means 13 establishes connection between the central processing unit 1 and the slave interface 15, the command 2 is transmitted to the communication means 23 of the console 16.

The console 16 is responsive to the command 2 to inherit the information 19 of the console 17 by the information inheriting means 20, and subsequently transmit the event message to the central processing unit 1 via the interface connecting device 7.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. A computer system comprising:

first and second operating consoles;

a central processing unit including command generating means for generating a command to transmit an event message; and an interface means connected between the central processing unit and the first and second operating consoles for transmitting said command to the first operating console from the central processing unit and for transmitting the event message to the central processing unit from the first operating console;

the interface means including, a timer means for measuring an elapsed time in response to said command, the timer means being reset in response to a reception of the event message from the first operating console, the timer means generating a time-out signal if the timer means does not receive the event message within a predetermined period of time from said command, and switching means for switching a transmission path of said command from the first operating console to the second operating console and for switching a reception path of the event message from the first operating console to the second operating console in response to the time-out signal, wherein the second operating console includes inheriting means for inheriting information of the first operating console upon receipt of the time-out signal from the timer means of the interface means, the central processing unit further including means for re-transmitting said command after the inheriting means inherits the information of the first operating console.

2. A computer system as set forth in claim 1, wherein the switching means in the interface means includes a reset demand means for regenerating said command from the command generating means in response to the time-out signal.

3. A computer system comprising:

first and second operating consoles;

a central processing unit including command generating means for generating a command to transmit an event message; and an interface means connected between the central processing unit and the first and second operating consoles for transmitting said command to the first operating console from the central processing unit and for transmitting the event message to the central processing unit from the first operating console;

the interface means including,
  switching means for switching a transmission path of said command from the first operating console to the second operating console and for switching a reception path of the event message by the central processing unit from the first operating console to the second operating console in response to a failure of the first operating console, wherein the second operating console includes inheriting means for inheriting information of the first operating console upon the failure of the first operating console, and the central processing unit further includes means for re-transmitting said command after the inheriting means inherits the information of the first operating console.

4. A computer system as set forth in claim 3, wherein the second operating console generates a switching demand in response to the failure of the first operating console and the switching means switches the transmission path of said command and the reception path of the event message in response to at least one of the time-out signal and the switching demand.

5. A computer system as set forth in claim 4, wherein the switching means in the interface means includes a reset demand means for regenerating said command from the command generating means in response to at least one of the time-out signal and the switching demand.

6. A computer system comprising:
a central processing unit (CPU);
a first console;
a second console;
an interface unit connecting the first and second consoles to the CPU, the interface unit including,
  a switch having a pole coupled to the CPU, a first throw coupled to the first console, and a second throw coupled to the second console, such that the CPU is coupled, via the switch, to one of the first console and the second console,
  wherein the switch transitions from the first throw to the second throw upon failure of the first console and transitions from the second throw to the first throw upon failure of the second console, and
  wherein the first console contains a communicating unit which is coupled to a failure detection unit of the second console, the failure detection unit of the second console being coupled to a communicating unit of the second console, the communicating unit of the second console being coupled to the interface unit, such that a failure of the first console is communicated by the communicating unit of the first console to the failure detection unit of the second console and the failure detection unit of the second console, via the communication unit of the second console, informs the interface unit of the failure of the first console.

7. A computer system comprising:
a central processing unit (CPU);
a first console;
a second console;
an interface unit connecting the first and second consoles to the CPU, the interface unit including,
  a switch having a pole coupled to the CPU, a first throw coupled to the first console, and a second throw coupled to the second console, such that the CPU is coupled, via the switch, to one of the first console and the second console,
  wherein the switch transitions from the first throw to the second throw upon failure of the first console and transitions from the second throw to the first throw upon failure of the second console, and
  wherein the second console contains a communicating unit which is coupled to a failure detection unit of the first console, the failure detection unit of the first console being coupled to a communicating unit of the first console, the communicating unit of the first console being coupled to the interface unit, such that a failure of the second console is communicated by the communicating unit of the second console to the failure detection unit of the first console and the failure detection unit of the first console, via the communicating unit of the first console, informs the interface unit of the failure of the second console.

8. The computer system of claim 6, wherein the communicating unit of the second console is further coupled to a failure detection unit of the first console, the failure detection unit of the first console being further coupled to the communicating unit of the first console, the communicating unit of the first console being further coupled to the interface unit, such that a failure of the second console is communicated by the communicating unit of the second console to the failure detection unit of the first console and the failure detection unit of the first console, via the communicating unit of the first console, informs the interface unit of the failure of the second console.

9. A computer system comprising:
a central processing unit (CPU);
a first console;
a second console;
an interface unit connecting the first and second consoles to the CPU, the interface unit including,
  a switch having a pole coupled to the CPU, a first throw coupled to the first console, and a second throw coupled to the second console, such that the CPU is coupled, via the switch, to one of the first console and the second console,
  wherein the switch transitions from the first throw to the second throw upon failure of the first console and transitions from the second throw to the first throw upon failure of the second console, and
  wherein the interface unit further includes a timer, the timer being set upon the transmission of a command from the CPU to one of the first and second consoles, the timer being reset upon the transmission of an event message from said one of the first and second consoles to the CPU, the timer issuing a time-out signal to the switch if the timer is not reset after a predetermined time from when the timer is set, the time-out signal indicating a failure in said one of the first and second consoles.

* * * * *